US010914887B2

(12) United States Patent
Cho et al.

(10) Patent No.: US 10,914,887 B2
(45) Date of Patent: Feb. 9, 2021

(54) DISPLAY APPARATUS

(71) Applicant: SAMSUNG ELECTRONICS CO., LTD., Suwon-si (KR)

(72) Inventors: Byoungjin Cho, Suwon-si (KR); Youngchol Lee, Suwon-si (KR); Namseok Roh, Suwon-si (KR); Kwansik Min, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/425,420

(22) Filed: May 29, 2019

(65) Prior Publication Data
US 2020/0012036 A1 Jan. 9, 2020

(30) Foreign Application Priority Data
Jul. 6, 2018 (KR) .................. 10-2018-0078764

(51) Int. Cl.
F21V 8/00 (2006.01)

(52) U.S. Cl.
CPC ......... *G02B 6/0051* (2013.01); *G02B 6/0053* (2013.01); *G02B 6/0055* (2013.01); *G02B 6/0088* (2013.01)

(58) Field of Classification Search
CPC .. G02B 6/0051; G02B 6/0053; G02B 6/0055; G02B 6/0088; G02F 2001/133607; G02F 2001/133614; G02F 2201/501; G02F 1/133605; G02F 1/133606; G02F 1/133615; G02F 1/133602
See application file for complete search history.

(56) References Cited

U.S. PATENT DOCUMENTS

| 7,313,309 | B2 | 12/2007 | Numata et al. |
| 7,990,490 | B2 | 8/2011 | Lee et al. |
| 8,743,466 | B2 | 6/2014 | Yamamoto |
| 9,484,557 | B2 | 11/2016 | Choi et al. |
| 9,581,759 | B2* | 2/2017 | Kim ..................... G02B 6/0026 |
| 9,733,413 | B2* | 8/2017 | Park ......................... F21K 9/64 |
| 10,114,247 | B2* | 10/2018 | Lee .................. G02F 1/133617 |
| 10,126,587 | B2* | 11/2018 | Chung .................. G02B 5/201 |

(Continued)

FOREIGN PATENT DOCUMENTS

| EP | 1798968 A2 | 6/2007 |
| KR | 10-2015-0004974 A | 1/2015 |

(Continued)

OTHER PUBLICATIONS

International Search Report (PCT/ISA/237) and Written Opinion (PCT/ISA/210) dated Sep. 18, 2019, issued by the International Searching Authority in International Application No. PCT/KR2019/006499.

(Continued)

*Primary Examiner* — Tsion Tumebo
(74) *Attorney, Agent, or Firm* — Sughrue Mion, PLLC

(57) ABSTRACT

A display apparatus is provided. The display apparatus includes a light source, a quantum dot sheet on which a reflective area that reflects light irradiated from the light source and a quantum dot area including a quantum dot that scatters the light irradiated from the light source are alternately disposed, and a display panel that displays an image using light provided from the quantum dot sheet.

18 Claims, 13 Drawing Sheets

(56) References Cited

U.S. PATENT DOCUMENTS

| | | | |
|---|---|---|---|
| 10,529,290 B1* | 1/2020 | Parsons | H01L 33/502 |
| 2006/0290253 A1* | 12/2006 | Yeo | G02B 5/0278 |
| | | | 313/116 |
| 2007/0159679 A1 | 7/2007 | Hagood et al. | |
| 2008/0310003 A1 | 12/2008 | Mi et al. | |
| 2012/0113672 A1* | 5/2012 | Dubrow | G02B 6/0068 |
| | | | 362/602 |
| 2013/0242228 A1* | 9/2013 | Park | G02F 1/133617 |
| | | | 349/61 |
| 2013/0335799 A1* | 12/2013 | Yoon | G02F 1/133553 |
| | | | 359/227 |
| 2014/0160408 A1* | 6/2014 | Cho | G02F 1/133617 |
| | | | 349/110 |
| 2015/0062490 A1* | 3/2015 | Kwon | G02B 6/003 |
| | | | 349/64 |
| 2015/0285969 A1* | 10/2015 | Kim | G02B 5/201 |
| | | | 359/891 |
| 2015/0308658 A1* | 10/2015 | Shin | B32B 3/266 |
| | | | 362/84 |
| 2015/0338698 A1 | 11/2015 | Sugiyama et al. | |
| 2016/0070137 A1* | 3/2016 | You | G02F 1/133609 |
| | | | 349/71 |
| 2017/0017121 A1 | 1/2017 | Park et al. | |
| 2019/0097097 A1* | 3/2019 | Ko | G02F 1/133606 |
| 2019/0391319 A1* | 12/2019 | Dubrow | G02B 6/0053 |

FOREIGN PATENT DOCUMENTS

| | | |
|---|---|---|
| KR | 10-1556610 B1 | 10/2015 |
| KR | 10-2017-0014755 A | 2/2017 |
| TW | I628477 B | 7/2018 |

OTHER PUBLICATIONS

Communication dated Jul. 31, 2019, issued by the European Patent Office in counterpart European Application No. 19177116.1.
Communication dated Apr. 29, 2020 issued by the European Patent Office in counterpart European Application No. 19177116.1.
Communication dated Dec. 18, 2020 issued by the European Patent Office in European Application No. 19 177 116.1.

\* cited by examiner

FIG. 4A  FIG. 4B  FIG. 4C
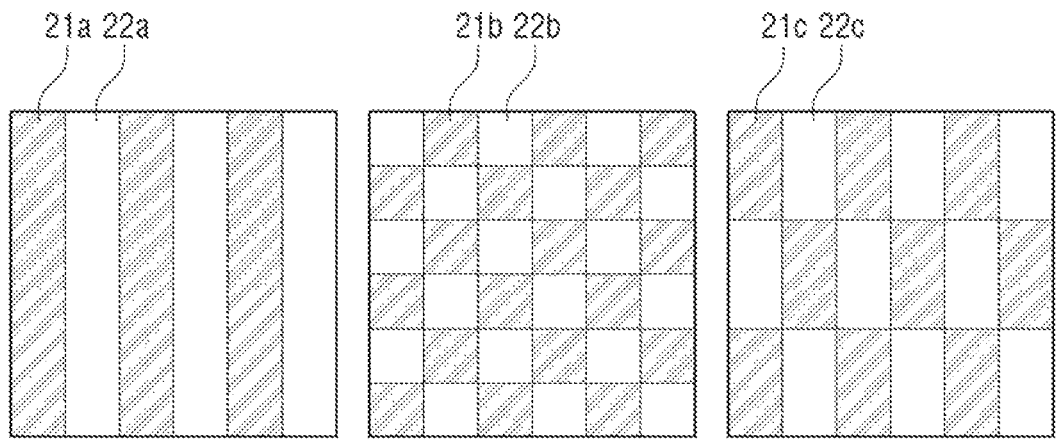
FIG. 4D  FIG. 4E  FIG. 4F
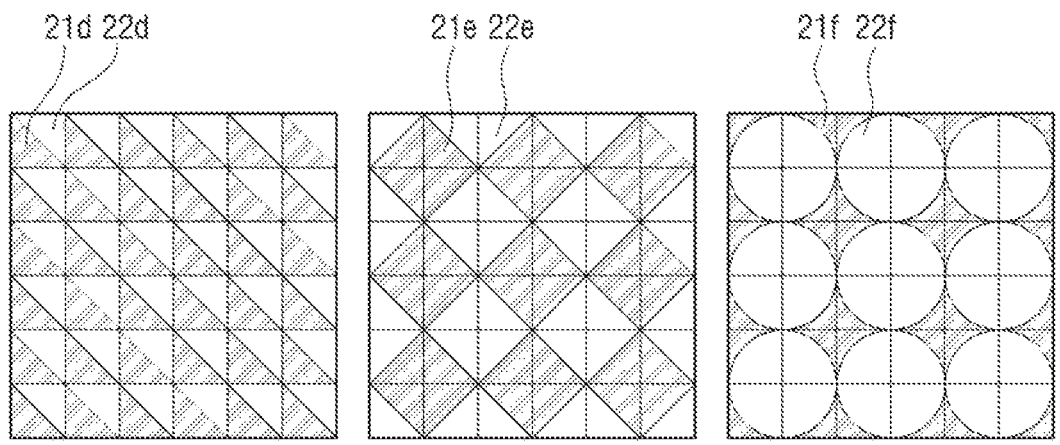
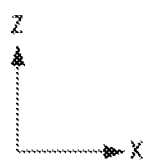

DISPLAY APPARATUS

CROSS-REFERENCE TO RELATED APPLICATIONS

This application is based on and claims priority under 35 U.S.C. § 119 to Korean Patent Application No. 10-2018-0078764, filed on Jul. 6, 2018, in the Korean Intellectual Property Office, the disclosure of which is incorporated by reference herein in its entirety.

BACKGROUND

1. Field

The disclosure relates to a display apparatus having improved color reproducibility and light concentrating power.

2. Description of Related Art

A display apparatus is an apparatus that receives various image data and displays the image data visually by using a display panel so that a user may visually recognize the visually displayed image data such as television, computer monitors, smartphones, etc.

A recently launched display apparatus includes a sheet including a quantum dot material for improving color reproducibility on a display panel, but there is a problem in that additional sheet scatters light so that luminance suitable for a display panel cannot be realized.

In addition, a light concentrating prim sheet to realize a certain level display panel is additionally provided, but there arises a problem that light is lost due to light reflected or refracted to the side surface.

SUMMARY

Provided is a display apparatus having improved color reproducibility and light concentrating power.

In accordance with an aspect of the disclosure, there is provided a display apparatus including a light source; a quantum dot sheet on which a reflective area that reflects light irradiated from the light source and a quantum dot area including a quantum dot that scatters the light irradiated from the light source are alternately disposed; and a display panel configured to display an image using the light provided from the quantum dot sheet.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 4A-4F are cross-sectional views illustrating deformation examples of a refractive area and a quantum dot area of a quantum dot sheet, according to various embodiments;

DETAILED DESCRIPTION

In order to fully understand the structure and effects of the disclosure, embodiments of the disclosure will be described with reference to the accompanying drawings. The disclosure may, however, be embodied in many different forms and should not be construed as limited to the embodiments set forth herein. It should be understood, however, that the description of the embodiments is provided to enable the disclosure of the disclosure to be complete, and will fully convey the scope of the disclosure to a person having ordinary skill in the art to which the disclosure belongs. In the accompanying drawings, the constituent elements are enlarged in size for convenience of explanation and the proportions of the constituent elements can be exaggerated or reduced.

It will be understood that when an element is referred to as being "on" or connected to" another element, it can be directly connected to the other element or intervening elements may also be present. In contrast, when an element is referred to as being "directly on" or "directly connected to" another element, no intervening elements are present. Meanwhile, other expressions describing relationships between components such as "~between" and "directly adjacent to~" may be construed similarly.

The terms such as "first," "second," and so on may be used to describe a variety of elements, but the elements should not be limited by these terms. As used herein, the terms "1st" or "first" and "2nd" or "second" may use corresponding components or elements regardless of importance or order and are used to distinguish one component or element from another without limiting the components or elements. The use of such ordinal numbers should not be construed as limiting the meaning of the term. For example, without departing from the scope of the disclosure, the first component may be referred to as a second component, and similarly, the second component may also be referred to as a first component.

The singular expression also includes the plural meaning as long as it does not differently mean in the context. In this specification, terms such as 'include' and 'have/has' should be construed as designating that there are such characteristics, numbers, operations, elements, components or a combination thereof in the specification, not to exclude the existence or possibility of adding one or more of other characteristics, numbers, operations, elements, components or a combination thereof.

Unless otherwise defined, all terms (including technical and scientific terms) used herein have the same meaning as commonly understood by one of ordinary skill in the art to which this disclosure belongs.

Figure 1:
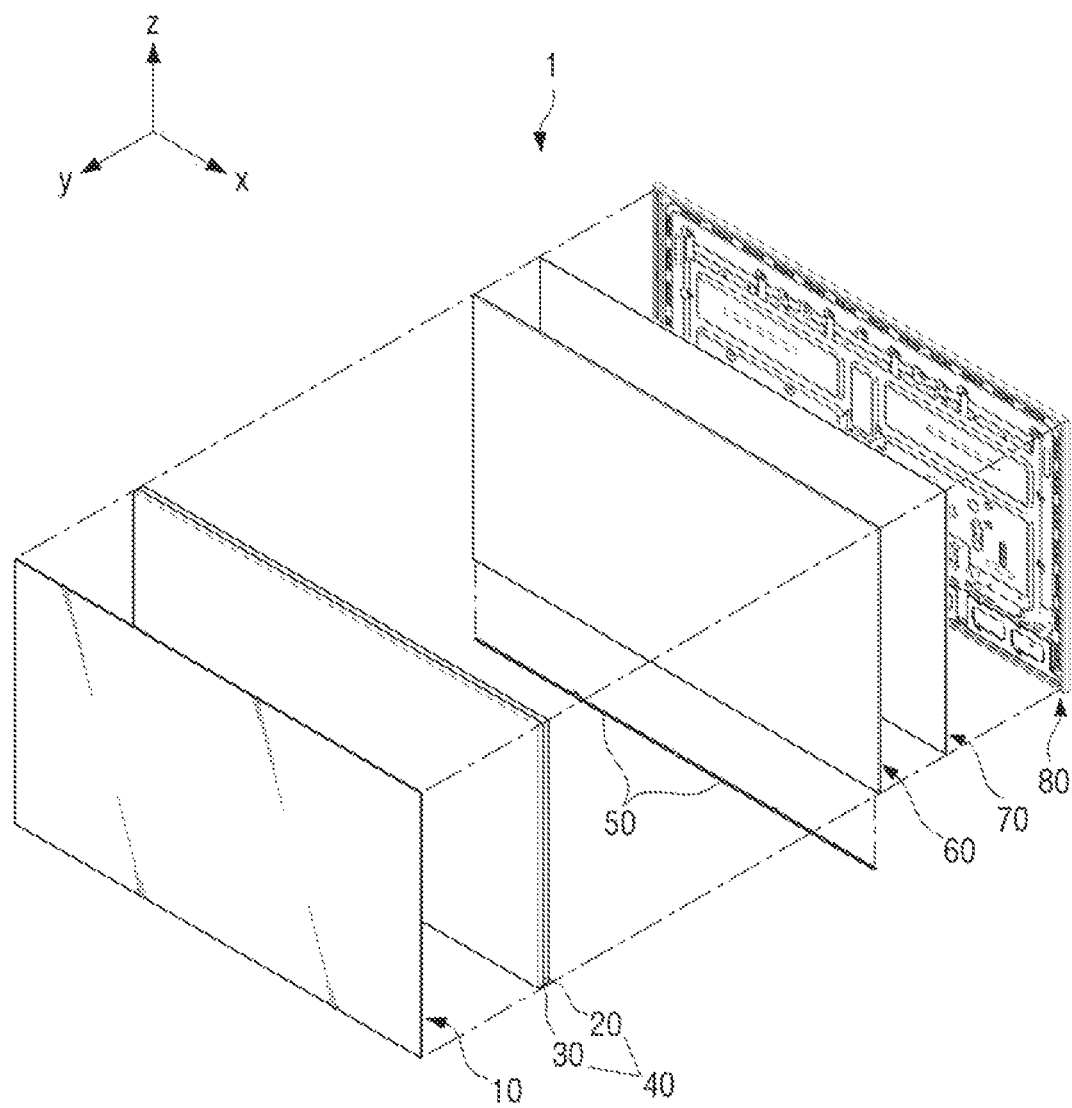
FIG. 1 is an exploded perspective view illustrating a display apparatus according to an embodiment.

FIG. 1 is an exploded perspective view illustrating a display apparatus according to an embodiment.

A display apparatus 1 may be an apparatus capable of processing image signals received from an external server, and visually displaying processed images such as televisions, monitors, portable multimedia apparatuses, portable communication apparatuses, etc. Any type of display apparatus could be used as long as the display apparatus visually displays an image.

Referring to FIG. 1, the display apparatus 1 may include a display panel 10, a high color light concentrating panel 40 including a quantum dot sheet 20 and a refractive sheet 30, a light source 50, a light guide plate 60, a reflective sheet 70 and a case 80.

The display panel 10 may display an image in a forward direction (a Y-axis direction of FIG. 1) according to an image signal input from the outside, and may be embodied as a light crystal display (LCD) panel.

Specifically, the display panel 10 may include a thin film transistor (TFT) (not shown) for deforming liquid crystal alignment of the light crystal display (LCD) panel, and a color filter (not shown) for realizing a color on light irradiated from the light source 50.

FIG. 1 illustrates an example in which the display apparatus 1 including the display panel 10 is in a rectangular square shape, but the shapes of the display apparats 1 and the display panel 10 are not limited thereto but could be embodied in various shapes. In some embodiments, the display apparatus 1 may be curved.

The high color light concentrating panel 40, the light guide plate 60, the reflective sheet 70, and the case 80 may be sequentially combined behind the display panel 10.

The light source 50 may irradiate light for realizing an image on the display panel 10, and output light (single colored light) of a single wavelength (single color), or light (white light) mixed with light of a plurality of wavelength bands.

The light source 50 may be arranged behind the display panel 10 and may directly irradiate light onto the display panel 10 (as a so-called direct-lit type display apparatus), or may be arranged on a side surface of the light guide plate 60 arranged behind the display panel 10 (as a so-called edge-lit type display apparatus) to indirectly irradiate light onto the display panel 10.

FIG. 1 illustrates a display apparatus 1 of an edge-lit type in which the light source 50 is spaced apart from the light guide plate 60 along the side surface of the light guide plate 60, but in other embodiments the display apparatus 100 may be embodied as a direct-lit type display apparatus in which the light source 50 faces the rear surface of the display panel 10.

The light guide plate 60 may guide light incident from the light source 50 to the display panel 10, change light irradiated from the light source 50 to surface light and irradiate the light toward the display panel 10.

The light guide plate 60 may be formed of poly methyl methacrylate (PMMA) or polycarbonate (PC).

The light guide plate 60 may be included in the display apparatus 1 of the edge-lit type, but in embodiments configured as a direct-lit type display apparatus may be omitted.

The reflective sheet 70 may be combined with the rear surface of the light guide plate 60, and may reflect light from the inside of the light guide plate 60 toward the rear surface of the light guide plate 60 into the inside of the light guide plate 60.

The reflective sheet 70 may be formed of a material that may reflect light, for example, a polymer.

The case 80 may be combined with the rear surface of the display apparatus 1, and may fix the display panel 10, the high color light concentrating panel 40, the light guide plate 60, and the reflective sheet 70 together.

The case 80 may be arranged behind the display panel 10, and may form the outsides of the rear portion and the side portion as well as to cover the side surface of the display panel 10.

The case 80 may cover various constituent elements included in the display apparatus 1 to not be exposed to the outside, and may protect various constituent elements included in the display apparatus 1 from an external impact.

Figure 2:
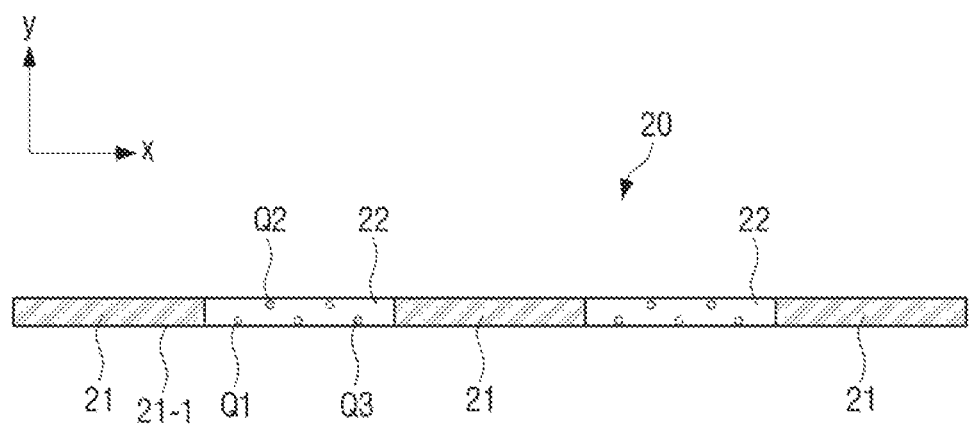
FIG. 2 is a cross-sectional view illustrating a quantum dot sheet, according to an embodiment.

FIG. 2 is a cross-sectional view illustrating a quantum dot sheet, according to an embodiment, and hereinafter, a structure of a quantum dot sheet 20 will be described in detail.

The quantum dot sheet 20 may include a reflective area 21 that reflects part of the light irradiated from the light source 50 and a quantum dot area 22 including quantum dots Q1 to Q3 that scatter part of the light irradiated from the light source. It is noted that only a few quantum dots are schematically shown and only three quantum dots Q1 to Q3 are specifically labeled in FIG. 2 for ease of description only.

The reflective area 21 and the quantum dot area 22 may be alternately arranged on the quantum dot sheet 20, as shown in the example of FIG. 2.

The reflective area 21 may partially reflect the light irradiated from the light source 50. Accordingly, the reflective area 21 may be formed of a material that reflects light, or may be coated on a lower surface 21-1 of the reflective area 21 with a material that reflects light.

The reflective area 21 may absorb part of the light irradiated from the light source 50. Accordingly, the reflective area 21 may include a material that may absorb light, or may include a material that absorbs light in the lower surface 21-1 of the reflective area 21.

In other words, it may be sufficient if the light irradiated from the light source cannot penetrate through the reflective area 21.

Accordingly, the light irradiated from the light source 50 may not penetrate through the reflective area 21, but may penetrate through the quantum dot sheet 20 only through the quantum dot area 22. In other words, due to the reflective area 21, light may not be incident on a low refractive area 31 (see FIG. 5), but may be incident on the quantum dot area 22 and the high refractive area 32 (see FIG. 5).

The quantum dot area 22 may include quantum dots that may scatter light of various wavelength bands, and the light irradiated from the light source 50 may penetrate therethrough.

Accordingly, the quantum dot area 22 may be formed of a material through which light is transmitted.

The quantum dots may be provided in an inorganic crystal substance or may be fine holes, each equal to or less than tens of nanometer (nm), and may absorb light of various wavelength bands and scatter light of a desired wavelength band.

For example, the quantum dot area 22 may include a first quantum dot Q1 for scattering red light of a wavelength band of approximately 625 nm to 750 nm, a second quantum dot Q2 for scattering green light of a wavelength band of approximately 520 nm to 570 nm, and a third quantum dot Q3 for scattering blue light of a wavelength band of approximately 470 nm.

Accordingly, when the light source 50 irradiates light of white color, light penetrating the quantum dot area 22 may scatter light of various wavelength bands of red, green, and blue colors. Therefore, the color reproducibility of an image realized in the display panel 10 may be improved.

However, the quantum dot area 22 may include not only the first to third quantum dots (Q1 to Q3), but to in some embodiments may include quantum dots for scattering light of wavelength bands for realizing various colors. That is, the quantum dots are not limited to red, green and blue light, but rather quantum dots additionally or alternatively may be provided for scattering light of various other colors.

FIGS. 1 and 2 illustrate an example in which the quantum dot sheet 20 is configured in a rectangular shape, but the structure is not limited thereto. The shape of the quantum dot sheet 20 may vary without limitation.

The quantum dot sheet 20 may be referred to alternatively as a color filter member, a semi-permeable member, etc. without limitation.

The quantum dot sheet 20 may have an area corresponding to the area of the light guide plate 60, and in some embodiments may have a greater area than the area of the light guide plate 60.

Figure 3:
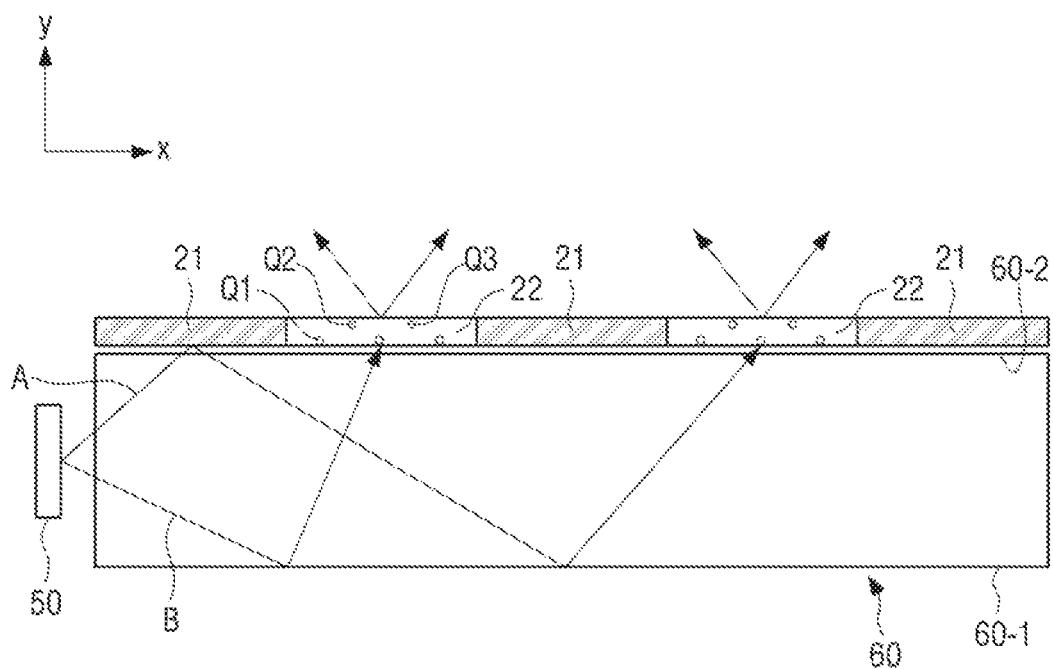
FIG. 3 is a cross-sectional view illustrating that light irradiated from a light source penetrates a quantum dot sheet, according to an embodiment.

FIG. 3 is a cross-sectional view illustrating that light irradiated from a light source penetrates a quantum dot sheet 20, according to an embodiment.

Referring to FIG. 3, the detailed function and operation of the quantum dot sheet 20 will be described.

The quantum dot sheet 20 may be arranged on an upper surface 60-2 of the light guide plate 60 at a predetermined distance therefrom. The quantum dot sheet 20 may be arranged between the display panel 10 and the light guide plate 60.

The light irradiated from the light source 50 may include a first light A and a second light B. The first light A may be irradiated toward the upper surface 60-2 of the light guide plate 60, reflected from the reflective area 21 of the quantum dot sheet 20, and incident on the inside of the light guide plate 60.

The first light A may be reflected from a lower surface 60-1 of the light guide plate 60 toward the quantum dot area 22 of the quantum dot sheet 20. The first light A incident on the quantum dot area 22 may collide with various quantum dots Q1 to Q3 of the quantum area 22 to be deformed in various colors of various wavelength bands. In other words, the various quantum dots Q1 to Q3 may scatter the first light A.

The second light B may be irradiated from the light source 50 toward the lower surface 60-1 of the light guide plate 60, and reflected from the lower surface 60-1 of the light guide plate 60 toward the quantum dot area 22. The second light B incident on the quantum dot area 22 may collide with various quantum dots Q1 to Q3 to be deformed in various colors of various wavelength bands. In other words, the various quantum dots Q1 to Q3 may scatter the second light B.

Accordingly, light irradiated from the light source 50 may be changed to surface light of the light guide plate 60, and transmitted through the quantum dot area 22 of the quantum dot sheet 20. Therefore, light irradiated from the light source 50 may realize a high color.

The light irradiated from the light source 50 may penetrate the quantum dot area 22, which is a specific area of the quantum dot sheet 20, to increase a light concentrating power of the light to be provided to the display panel 10 and improve the overall luminance of the display panel 10.

FIG. 4A, FIG. 4B, FIG. 4C, FIG. 4D, FIG. 4E and FIG. 4F are cross-sectional views illustrating deformation examples of a refractive area 21 and a quantum dot area 22 of a quantum dot sheet, according to various embodiments.

The quantum dot area 22 of the quantum dot sheet 20 may be in a circular shape or a polygonal shape. In other words, the quantum dot area 22 may be formed in patterns of various shapes on the quantum dot sheet 20, as illustrated in the examples of FIGS. 4A-4F.

The reflective area 21 may form an area other than the quantum dot sheet 20 in which the quantum dot area 22 is formed.

In addition, a ratio of the reflective area 21 to the quantum dot area 22 of the quantum dot sheet 20 may vary.

Referring to FIG. 4A, FIG. 4B, and FIG. 4C, the reflective area 21a, 21b, and 21c, respectively, and the quantum dot area 22a, 22b, and 22c, respectively, may be alternately arranged in the quantum dot sheet 20 in a rectangular or square shape, and a ratio of the reflective area 21a, 21b, and 21c to the quantum dot area 22a, 22b, and 22c may vary. In other words, a first ratio of reflective area 21a to the quantum dot area 22a in FIG. 4A may be different than a second ratio of reflective area 21b to the quantum dot area 22b in FIG. 4B, which may be different than a third ratio of reflective area 21c to the quantum dot area 22c in FIG. 4C.

Referring to FIG. 4D to FIG. 4E, the reflective area 21d to 21e and quantum dot area 22d to 22e may be alternately arranged on the quantum dot sheet 20 in a triangular shape.

Referring to FIG. 4F, the quantum dot area 22f may have a circular shape, and the reflective area 21f may be arranged in the remaining area of the quantum dot sheet 20 in which the quantum dot area 22f is not formed.

Figure 5:
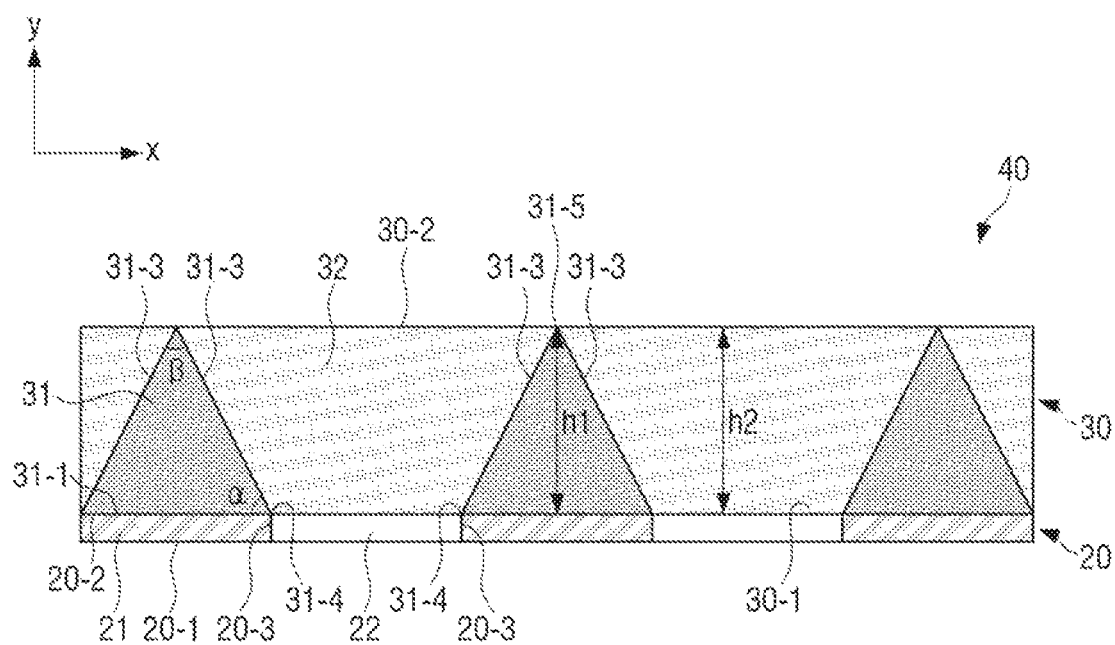
FIG. 5 is a cross-sectional view illustrating a quantum dot sheet and a refractive sheet, according to an embodiment.

FIG. 5 is a cross-sectional view illustrating a quantum dot sheet 20 and a refractive sheet 30.

Hereinafter, referring to FIG. 5, the detailed structure of the refractive sheet 30 will be described.

The refractive sheet 30 may be arranged on a quantum dot sheet 20, and a low refractive area 31 and a high refractive area 32 of the refractive sheet 30 may be alternately arranged. To be specific, the refractive sheet 30 may be arranged on an upper surface 20-2 of the quantum dot sheet 20, and the low refractive area 31 and the high refractive area 32 may be alternately arranged. Being arranged on the quantum dot sheet 20 may denote that the refractive sheet 30 is disposed on a positive Y-axis side on the upper surface 20-2 of the quantum dot sheet 20, as shown in FIG. 5.

The high refractive area 32 may be arranged on the quantum dot area 22, and the low refractive area 31 may be arranged on the refractive area 21. The high refractive area 32 may correspond to the quantum dot area 22, and the low refractive area 31 may correspond to the reflective area 21.

Accordingly, light penetrating the quantum dot area 22 may penetrate the high refractive area 32, and be reflected and refracted by the low refractive area 31, so that the light may be focused in a specific direction.

The refractive sheet 30 may be integrally formed with the quantum dot sheet 20. However, the refractive sheet 30 is not limited to being integrally formed with the quantum dot sheet 20, and in some embodiments, a separate member may be arranged between the refractive sheet 30 and the quantum dot sheet 20.

The low refractive area 31 may be formed in a 3D shape, and the cross-section of the low refractive area 31 may be decreased toward the upper portion of the refractive sheet 30. In other words, the reflective surface 31-3 as the side surface of the low refractive area 31 may be formed to have a first angle (α) with respect to the upper surface 20-2 of the refractive sheet 30. Stated another way, the low refractive area 31 may have roughly a triangular shape and the high refractive area may have roughly a trapezoidal shape, as shown in FIG. 5.

Accordingly, the low refractive area 31 may reflect the light penetrating the quantum dot area 22, and improve the light concentrating power of the light penetrating the quantum dot area 22.

The low refractive area 31 may include a material through which part of the light penetrating through the quantum dot area 22 is transmitted, and may be formed of a material having a refractive index (n1) smaller than a refractive index (n2) of the high refractive area 32. Therefore, light incident on the low refractive area 31 from the high refractive area 32 may have a specific critical angle due to a difference between material substances, whereby the refractive indices of the low refractive area 31 and the high refractive area 32 are different from each other, and light incident at a greater angle than a critical angle, may be totally reflected from the low refractive area 31.

To be specific, the low refractive area 31 may be formed of a material with a refractive index of 1.5 or less, and the high refractive area 32 may be formed of a material with refractive index of more than 1.5.

The light incident at an angle smaller than a critical angle may be incident on the low refractive area 31, and the light incident on the low refractive area 31 may be reflected or refracted from within the low-refractive area 31.

Accordingly, by reflecting or refracting light having a specific angle toward the upper surface 20-2 of the refractive sheet 30 selectively, and removing light of a wavelength band unnecessary for realizing a high color, the light concentrating power with respect to high color light may be increased.

The low refractive area 31 may be formed of a material that transmits light, but is not limited thereto, and in some embodiments, the low refractive area 31 may include a material that may reflect all light penetrating the quantum dot area 22.

The low refractive area 31 itself may be formed of a reflective material. A reflective surface 31-3 of the low reflective area 31 may be coated with a reflective material such as Aluminum or Chromium to reflect light.

Accordingly, by reflecting light penetrating the quantum dot area 22 toward the upper surface 20-2 of the reflective sheet 30, the luminance of the display panel 10 may be increased with small power consumption.

A bottom edge 31-4 of the low refractive area 31 may coincide with an edge 20-3 of the reflective area 21.

Accordingly, light in a side surface direction of the light penetrating the quantum dot area 22 arranged between the reflective areas 21 may be reflected from the low refractive area 31 and directed upwardly toward the display panel 10.

Therefore, the light penetrating through the quantum dot area 22 may maintain a high color and light concentrating power may be improved. Most of the light penetrating through the quantum dot area 22 may be incident on the high refractive area 32 without loss of light transmitted through the quantum dot area 22.

An angle (β) between the reflective surfaces 31-3 of the low refractive area 31 with respect to the cross-section perpendicular to the lower surface 30-1 of the refractive sheet 30 may be an acute angle. The low refractive area 31 may have a height (h1) or more so that the angle (β) between the reflective surfaces 31-3 may be the acute angle. The height (h1) may be predetermined. Therefore, the low refractive area 31 may be formed at the height (h1) near the quantum dot area 22, and may reflect most of light in the side surface direction of the light that penetrates the quantum dot area 22.

The low refractive area 31 may have a horn shape in which the area facing the reflective area 21 is the low surface 31-1. The low refractive area 31 may have a vertex 31-5 located at the height (h1) from the low surface 31-1 having a predetermined area.

Accordingly, the low refractive area 31 may be formed to surround the side portion of the high refractive area 32 disposed on the quantum dot area 22, and may reflect most of the light in the side surface direction of the light penetrating the quantum dot area 22 toward the upper surface 30-2 of the refractive sheet 30.

The high refractive area 32 may be alternately arranged with the low refractive area 31 within the refractive sheet 30, and may cover the upper portion of the quantum dot area 22 and the reflective surface 31-3 of the low refractive area 31.

The high refractive area 32 may include a material that transmits light, and a height h2 of the high refractive area 32 from the low surface 30-1 of the refractive sheet 30 may be equal to or greater than the height h1 of the low refractive area 31 from the lower surface 30-1 of the refractive sheet 30.

Accordingly, the high refractive area 32 may form the flat upper surface 30-2 of the refractive sheet 30, and light penetrating the high refractive area 32 may provide uniform surface light to the display panel 10 through the flat upper surface 30-2 of the refractive sheet 30.

Figure 6:
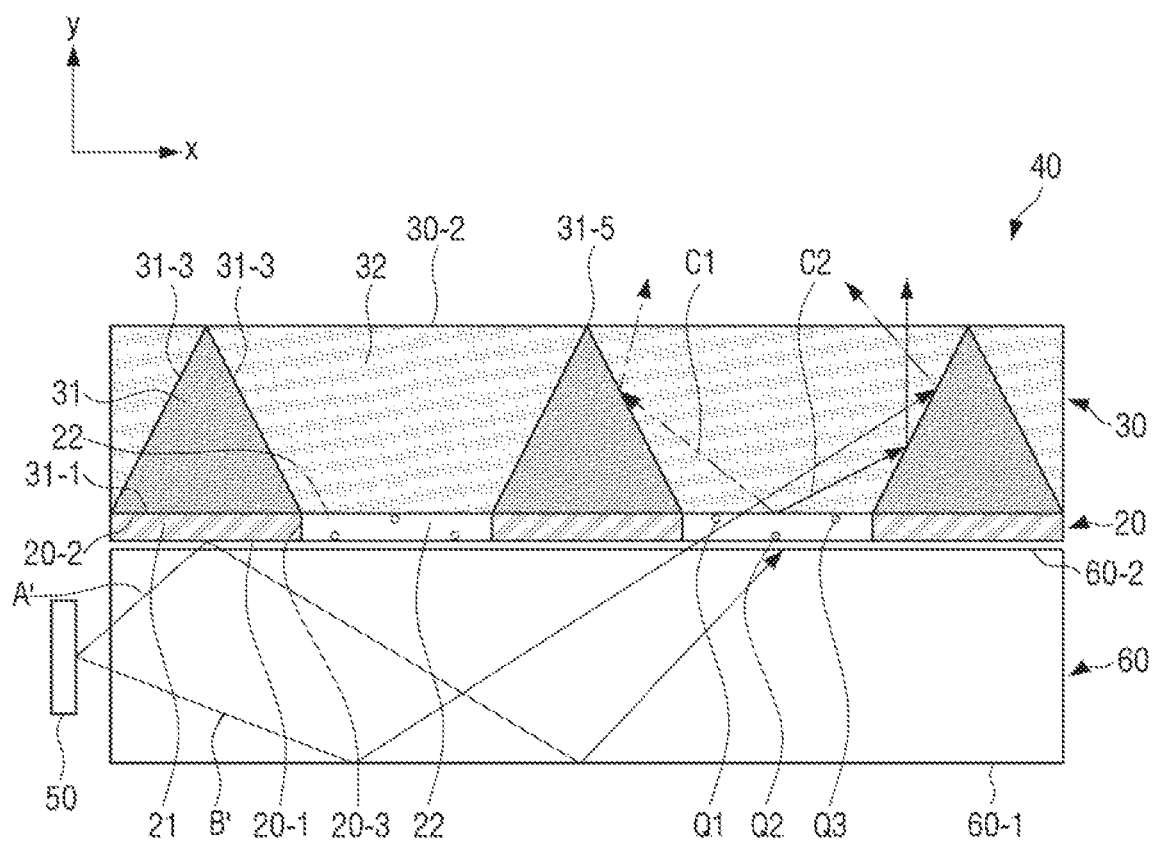
FIG. 6 is a cross-sectional view illustrating that light irradiated from a light source penetrates a quantum dot sheet and a refractive sheet, according to an embodiment.

FIG. 6 is a cross-sectional view illustrating that light irradiated from a light source penetrates a quantum dot sheet and a refractive sheet 30, according to an embodiment.

Referring to FIG. 6, the function and operation of the high color light concentrating panel 40 including a quantum dot sheet 20 and a refractive sheet 30 will be described in detail.

The light irradiated from the light source 50 may include a third light A' and a fourth light B'. The third light A' may be irradiated toward an upper surface 60-2 of the light guide plate 60 from the light source 50, reflected from the reflective area 21 of the quantum dot sheet 20, and incident on the inside of the light guide plate 60.

The third light A' may be reflected from the lower surface 60-1 of the light guide plate 60 toward the quantum dot area 22 of the quantum dot sheet 20. The third light A' incident on the quantum dot area 22 may collide with various quantum dots Q1 to Q3 of the quantum dot area 22, so that the scattering light C1 and C2 of various wavelength bands may be scattered.

The scattering light C1 and C2 may penetrate two side portions of the high refractive area 32 due to the scattering characteristic, and be alternately arranged with the high refractive area 32 to be reflected from the low refractive area 31 arranged on both side portions of the high refractive area 32, as shown by black arrows on the right-hand side of FIG. 6.

The scattering light C1 and C2 may be reflected toward the upper surface 30-2 of the refractive sheet 30 to improve the light concentrating power, and then may provide light to the display panel 10 to increase the luminance of the display panel 10.

For ease of explanation, it is exemplified that the third light A' collides with the quantum dots to be scattered, but in some embodiments the third light A' may not collide with a quantum dot.

The fourth light B' may be irradiated toward the lower surface 60-1 of the light guide plate 60 from the light source 50, and reflected from the lower surface 60-1 of the light guide plate 60 toward the quantum dot area 22. The fourth light B' incident on the quantum dot area 22 may collide with various quantum dots Q1 to Q3 of the quantum dot area 22 to be changed to various colors of various wavelength bands. In this situation, the fourth light B' would act similar to the third light A' shown in FIG. 6, albeit with a different trajectory through the light guide plate 60.

However, when the fourth light B' penetrates the quantum dot area 22, the fourth light B' may not collide with the quantum dots Q1 to Q3, but may penetrate through the quantum dot area 22, as shown in FIG. 6. In this case, the fourth light B' may penetrate the high refractive area 32 without change to a specific wavelength band. The light toward the both side surfaces of the high refractive area 32 of the fourth light B' penetrating the high refractive area 32 may be reflected and refracted from the low refractive area 31 to face toward the upper surface 30-2 of the refractive sheet 30, as shown in FIG. 6.

Accordingly, the third and fourth light A' and B' irradiated from the light source 50 may be transmitted through only the quantum dot area 22 of the quantum dot sheet 20 to improve color reproducibility and light concentrating power more than a threshold level. The light penetrating the quantum dot sheet 20 may be refracted and reflected through the low refractive area 31 of the refractive sheet 30 to increase the light concentrating power of light having improved color reproducibility, and realize a luminance of the display panel 10.

In addition, there is no need for an additional prism sheet because of the novel structure of the high color light concentrating panel 40 including the quantum dot sheet 20 and the refractive sheet 30, and thus the manufacturing cost of the display apparatus 1 may be reduced.

The paths of the third and fourth light A' and B' in FIG. 6 are illustrative, but the paths are not limited thereto.

Figure 7:
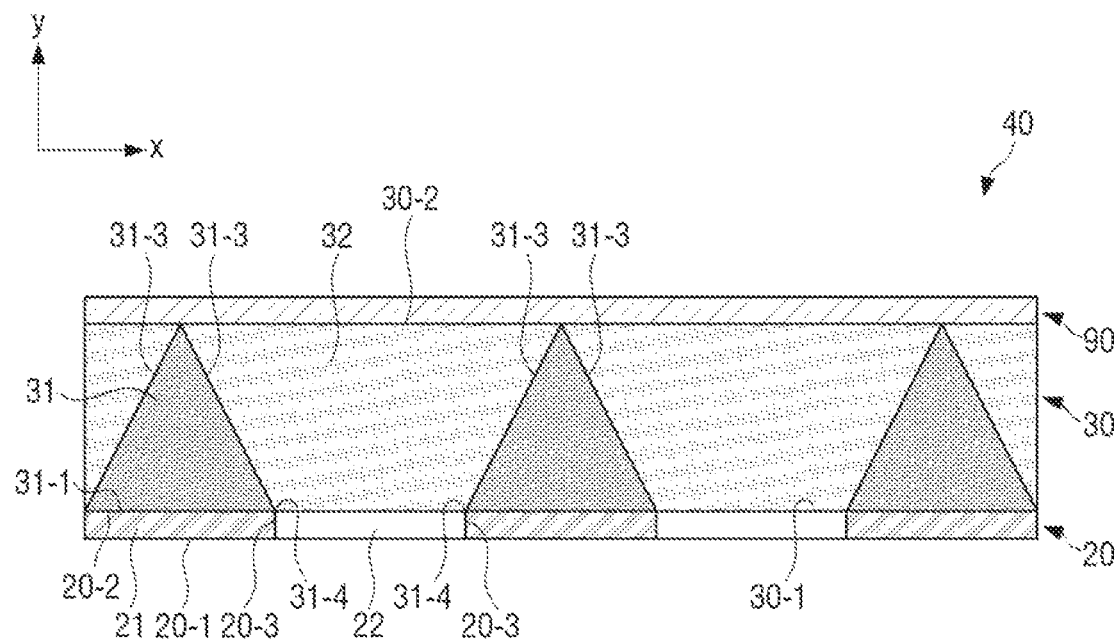
FIG. 7 is a cross-sectional view illustrating that a double brightness enhancement film (DBEF) is combined with a refractive sheet, according to an embodiment.

FIG. 7 is a cross-sectional view illustrating that the refractive sheet 30 is combined with a double brightness enhancement film (DBEF), according to an embodiment.

The double brightness enhancement film (DBEF) 90 may be arranged between the refractive sheet 30 and the display panel 10 to increase the luminance of light provided to the display panel 10. The double brightness enhancement film (DBEF) 90 may be arranged on the refractive sheet 30. The double brightness enhancement film (DBEF) 90 may be stacked on an upper surface 30-2 of the refractive sheet 30.

In some embodiments, the double brightness enhancement film (DBEF) 90 may be arranged between the quantum dot sheet 20 and the refractive sheet 30, so that the quantum dot sheet 20, the double brightness enhancement film (DBEF) 90, and the refractive sheet 30 may be sequentially stacked.

Accordingly, light sequentially penetrating the quantum dot sheet 20 and the refractive sheet 30 may penetrate the double brightness enhancement film (DBEF) 90 to improve the light concentrating power, so that the luminance of the display panel 10 may be increased.

Figure 8:
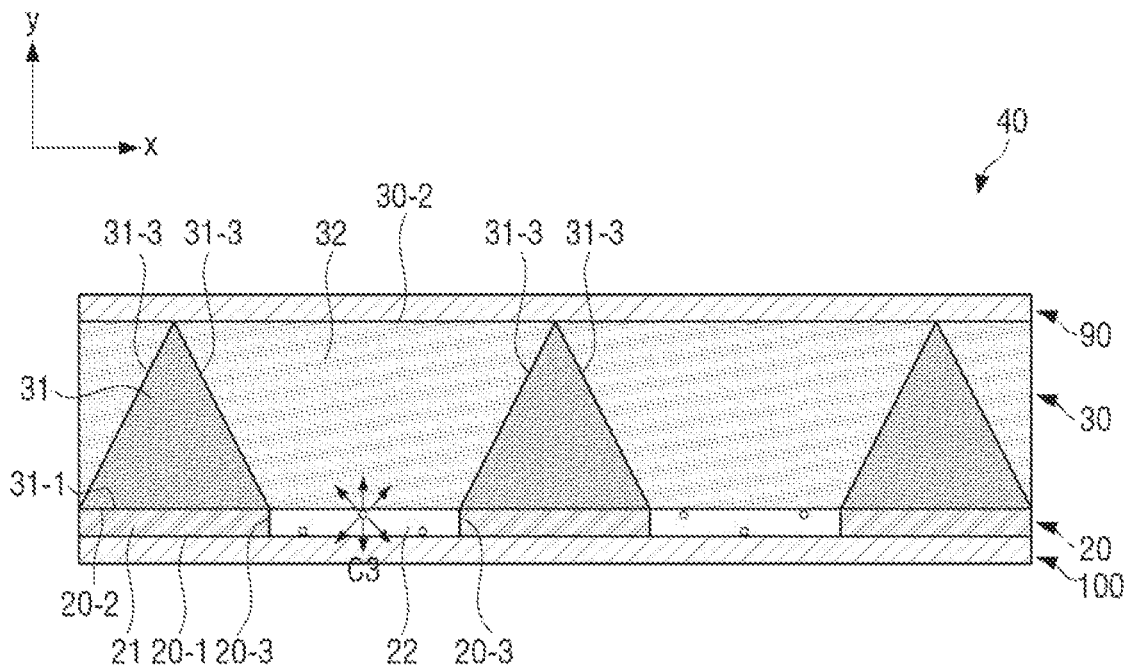
FIG. 8 is a cross-sectional view illustrating that a dichroic filter is combined in the structure of FIG. 7, according to an embodiment.

FIG. 8 is a cross-sectional view illustrating that a dichroic filter is combined in the structure of FIG. 7, according to an embodiment.

A dichroic filer 100 may be a light filter that selectively transmits light according to a light wavelength, and arranged under the lower surface 20-1 of the quantum dot sheet 20. To be specific, the dichroic filter 100 may be arranged between the quantum dot sheet 20 and the light guide plate 60.

By selectively transmitting light C3 scattered from the quantum dot area 22 toward the lower surface 20-1 of the quantum dot sheet 20, only the light of a required wavelength band may be reflected toward the refractive sheet 30.

Therefore, color reproducibility realized in the display panel 10 may be improved through the dichroic filter 100.

Figure 9:
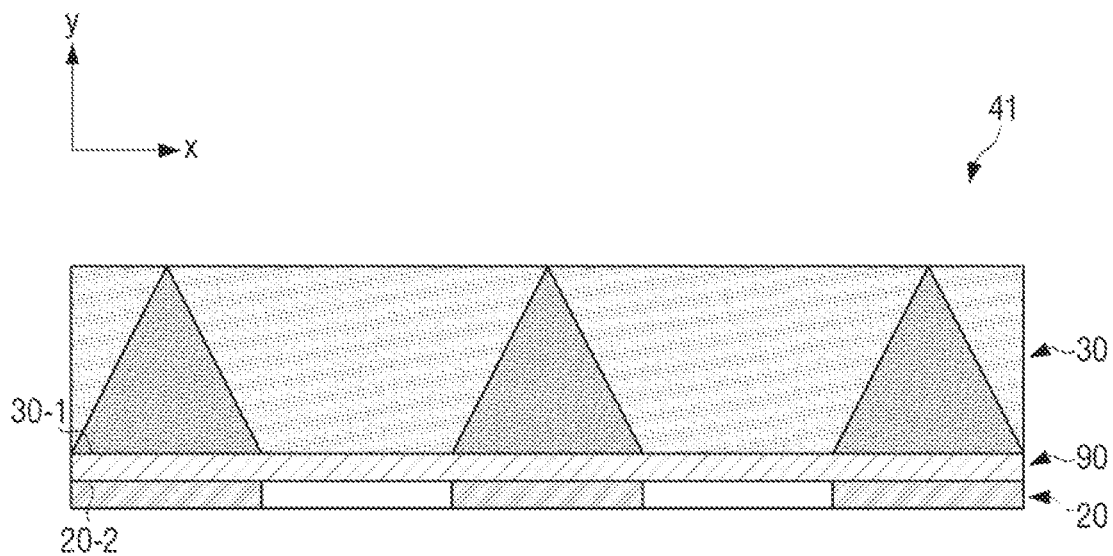
FIG. 9 is a cross-sectional view illustrating the structure of FIG. 7, according to an embodiment.

FIG. 9 is a cross-sectional view illustrating an example of the structure of FIG. 7, according to an embodiment. Referring to FIG. 9, a double brightness enhancement film (DBEF) 90 may be arranged between a quantum dot sheet 20 and a refractive sheet 30.

To be specific, the double brightness enhancement film (DBEF) may be arranged in contact with the upper surface 20-2 of the quantum dot sheet 20 and the lower surface 30-1 of the refractive sheet 30.

In more detail, referring to FIG. 9, the quantum dot sheet 20, the double brightness enhancement film (DBEF) 90, and the refractive sheet 20 may be sequentially stacked in a high color light concentrating panel 40 longitudinally (Y-axial direction).

Accordingly, the double brightness enhancement film (DBEF) 90 may be stacked on one surface of the quantum dot sheet 20 to cover one surface of the quantum dot sheet 20 including a quantum dot area 22 which is vulnerable to oxygen and moisture. Therefore, the light time of the quantum dot sheet 20 may be increased and luminance may be improved through the double brightness enhancement film (DBEF) 90 by preventing the quantum dot sheet 20 from contacting oxygen or moisture.

Figure 10:
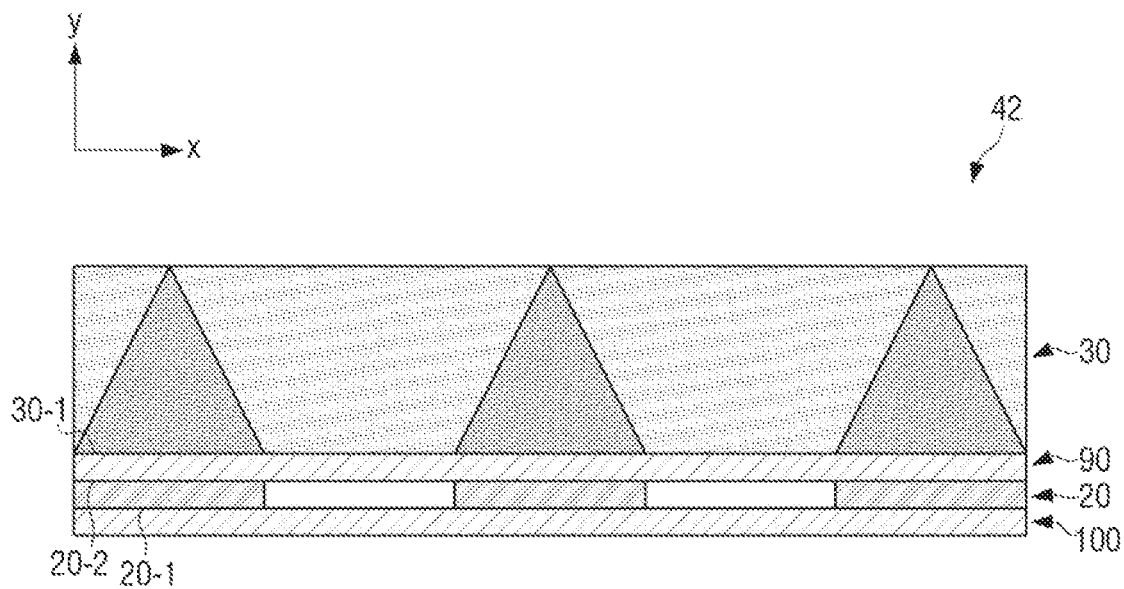
FIG. 10 is a cross-sectional view illustrating that a dichroic filter is combined in the structure of FIG. 9, according to an embodiment.

FIG. 10 is a cross-sectional view illustrating that a dichroic filter is combined in the structure of FIG. 9, according to an embodiment. The dichroic filter 100 may be arranged under the quantum dot sheet 20. To be specific, the dichroic filter 100 may be arranged under the lower surface 20-1 of the quantum dot sheet 20 to cover one surface of the quantum dot sheet 20.

In more detail, referring to FIG. 10, the dichroic filter 100, the quantum dot sheet 20, the double brightness enhancement film (DBEF) 90, and the refractive sheet 30 may be sequentially stacked in a high color light concentrating panel 42 longitudinally (Y-axial direction).

The dichroic filter 100 and the double brightness enhancement film (DBEF) 90 may respectively cover the lower surface 20-1 and the upper surface 20-2 of the quantum dot sheet 20, respectively, to prevent the quantum dot sheet 20 from contacting oxygen or moisture. Therefore, the life time of the quantum dot sheet 20 may be improved, the luminance may be improved through the double brightness enhancement film (DBEF) 90, and the color reproducibility of the display panel 10 may be improved through the dichroic filter 100.

Figure 11:
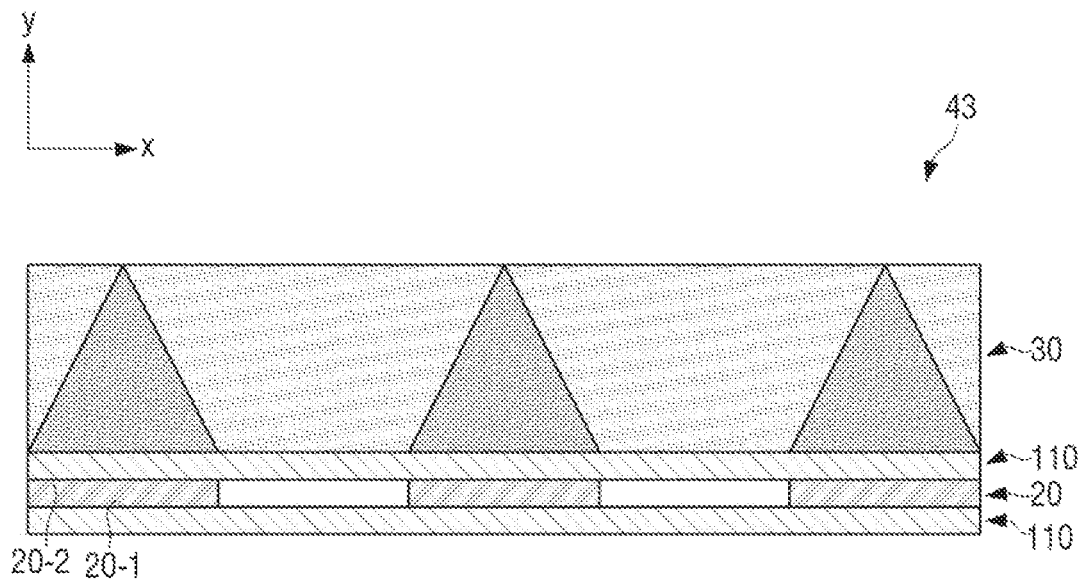
FIG. 11 is a cross-sectional view illustrating an example in which a barrier film is combined in the structure of FIG. 5, according to an embodiment.

FIG. 11 is a cross-sectional view illustrating an example in which a barrier film is combined in the structure of FIG. 5, according to an embodiment. The barrier film 110 may have light transmittance, and be formed of various materials such as an inorganic thin film, an oxide thin film, etc. The barrier film 110 may be arranged on the upper surface 20-2 or under the lower surface 20-1, or both of the quantum dot sheet 20 to prevent the quantum dot area 22 from contacting oxygen or moisture.

Accordingly, the barrier film 110 may cover one surface of the quantum dot sheet 20 to improve the light time of the quantum dot sheet 20.

Figure 12:
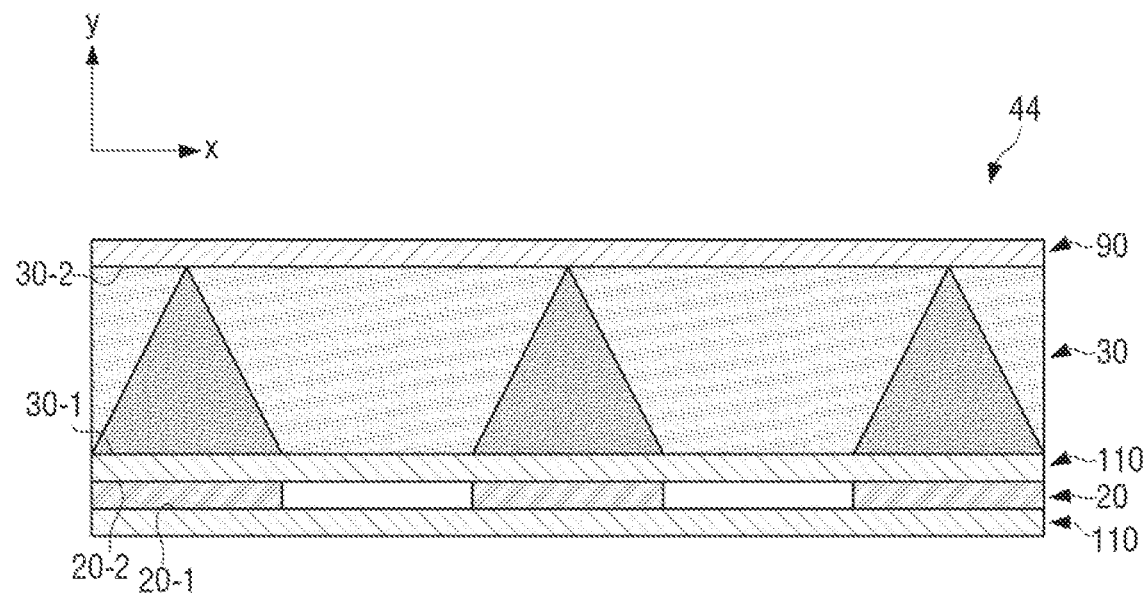
FIG. 12 is a cross-sectional view illustrating that a double brightness enhancement film (DBEF) is combined in the structure of FIG. 11, according to an embodiment.

FIG. 12 is a cross-sectional view illustrating that a double brightness enhancement film (DBEF) is combined in the structure of FIG. 11, according to an embodiment.

Referring to FIG. 11, the double brightness enhancement film (DBEF) 90 may be arranged on the upper surface 30-2 of the refractive sheet 30. To be specific, referring to FIG. 12, the barrier film 110, the quantum dot sheet 20, the barrier film 110, the refractive sheet 30, and the double brightness enhancement film (DBEF) 90 may be sequentially stacked in the high color light concentrating panel 42 longitudinally (Y-axis direction).

Accordingly, referring to FIG. 12, a high color light concentrating panel 44 may increase the light time of the quantum dot sheet 20, and the luminance by using the double brightness enhancement film (DBEF) 90.

Figure 13:
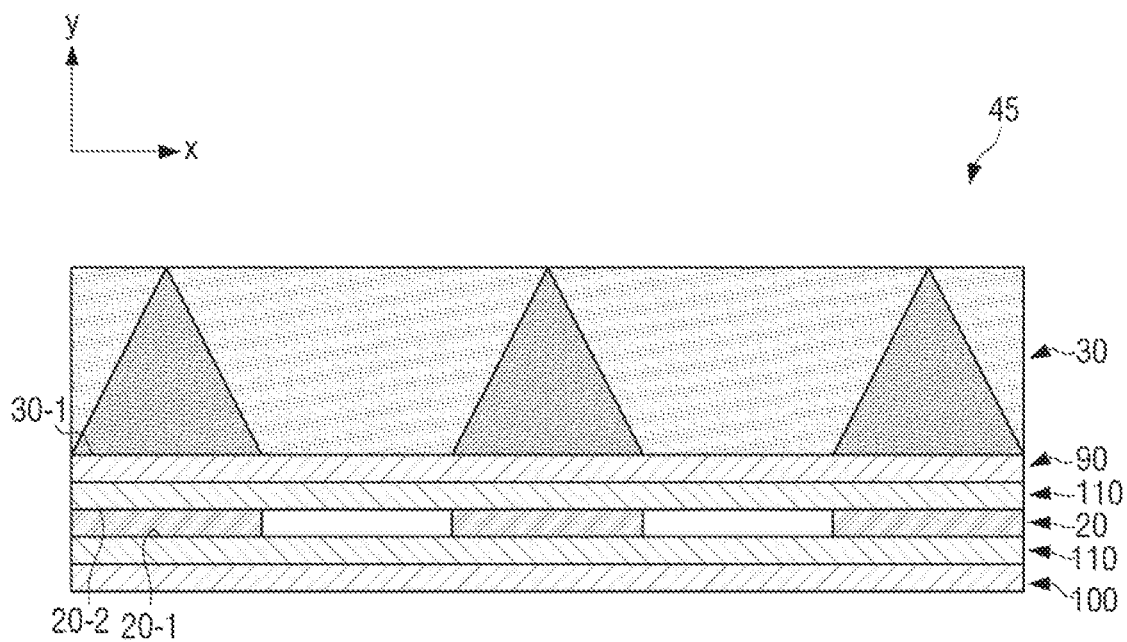
FIG. 13 is a cross-sectional view illustrating a deformation example embodiment in which a barrier film and a dichroic filter is additionally combined in the structure of FIG. 10, according to an embodiment.

FIG. 13 is a cross-sectional view illustrating a deformation example in which a barrier film and a dichroic filter is additionally combined in the structure of FIG. 10, according to an embodiment.

Referring to FIG. 10, the barrier film 110 each may be arranged on the lower surface 20-1 and the upper surface 20-2 of the quantum dot sheet 20. To be specific, referring to FIG. 13, the dichroic filter 100, the barrier film 110, the quantum dot sheet 20, the barrier film 110, the double brightness enhancement film (DBEF) 90 may be sequentially stacked on a high color light concentrating panel 45 longitudinally (Y-axis direction).

Accordingly, the barrier film 110 may increase the life time of the quantum dot sheet 20, and improve the luminance using double brightness enhancement film (DBEF) 90. Simultaneously, the color reproducibility of the display panel 10 may be improved through the dichroic filter 100.

In addition, in an edge-lit type display apparatus 1 in which a light source 50 is arranged to be spaced apart from the light guide plate 60 at a predetermined distance along a side surface of the light guide plate 60 arranged in a rear direction of the display panel 10 to guide light toward the display panel 10, the quantum dot sheet 20 and the refractive sheet 30 may be arranged between the display panel 10 and the light guide plate 60 in the display apparatus 1.

In a direct-lit type display apparatus in which a light source is arranged to be spaced apart from a display panel at a predetermined interface to face a rear surface of the display panel, at least one of the quantum dot sheet 20 and the refractive sheet 30 may be arranged between the display panel and the light source.

In other words, the quantum sheet 20 and the refractive sheet 30 may be applied to both a direct-lit type display apparatus and an edge-lit type display apparatus.

While the disclosure has been particularly shown and described with reference to exemplary embodiments thereof, it is to be understood that the disclosure is not limited to the exemplary embodiments. The configuration and operation of each embodiment may be implemented in combination with at least one other embodiment.

Although exemplary embodiments have been shown and described, it will be appreciated by those skilled in the art that changes may be made to these exemplary embodiments without departing from the principles and spirit of the present disclosure. Accordingly, the scope of the present disclosure is not construed as being limited to the described exemplary embodiments, but is defined by the appended claims as well as equivalents thereto.

What is claimed is:

1. A display apparatus comprising:
   a light source;
   a quantum dot sheet on which a reflective area that reflects light irradiated from the light source and a quantum dot area including a quantum dot that scatters the light irradiated from the light source are alternately disposed;
   a refractive sheet disposed on the quantum dot sheet, and on which a high refractive area and a low refractive area are alternately disposed, the high refractive area being disposed on the quantum dot area to correspond to the quantum dot area and the low refractive area being disposed on the reflective area to correspond to the reflective area; and
   a display panel configured to display an image using the light provided from the quantum dot sheet,
   wherein a bottom edge of the low refractive area at a point at which the lower refractive area meets the high refractive area coincides with an edge of the reflective area at a point at which the reflective area meets the quantum dot area.

2. The display apparatus as claimed in claim 1, wherein a cross-sectional area of the low refractive area is decreased toward an upper portion of the refractive sheet.

3. The display apparatus as claimed in claim 2, wherein the low refractive area has a horn shape with a lower surface contacting the reflective area.

4. The display apparatus as claimed in claim 3, wherein an angle between reflective surfaces of the low refractive area with respect to a cross-sectional surface perpendicular to the lower surface of the refractive sheet is an acute angle.

5. The display apparatus as claimed in claim 1, wherein the quantum dot area has a circular shape or a polygonal shape.

6. The display apparatus as claimed in claim 1, wherein the low refractive area is formed of a first material having a first refractive index of 1.5 or less, and
   wherein the high refractive area is formed of a second material having a second refractive index of more than 1.5.

7. The display apparatus as claimed in claim 6, wherein the low refractive area includes a material to which all of the light that penetrates through the quantum dot area is reflected.

8. The display apparatus as claimed in claim 1, wherein a first height of the high refractive area from a lower surface of the refractive sheet is equal to or greater than a second height of the low refractive area from the lower surface of the refractive sheet.

9. The display apparatus as claimed in claim 1, wherein the quantum dot sheet is integrally formed with the refractive sheet.

10. The display apparatus as claimed in claim 1, further comprising:
    a light guide plate disposed behind the display panel to guide the light to the display panel,
    wherein the light source is disposed to be spaced apart a distance from the light guide plate along a side surface of the light guide plate, and
    wherein the quantum dot sheet is disposed between the display panel and the light guide plate.

11. The display apparatus as claimed in claim 1, wherein a double brightness enhancement film (DBEF) is disposed on the refractive sheet.

12. The display apparatus as claimed in claim 1, wherein a double brightness enhancement film (DBEF) is disposed between the refractive sheet and the quantum dot sheet.

13. The display apparatus as claimed in claim 11, wherein a dichroic filter is disposed at the bottom of the quantum dot sheet.

14. The display apparatus as claimed in claim 11, wherein a barrier film is disposed on an upper surface of the quantum dot sheet or at the bottom of the quantum dot sheet, or both.

15. The display apparatus as claimed in claim 14, wherein a dichroic filter is disposed under the quantum dot sheet.

16. The display apparatus as claimed in claim 1, a side edge of the low refractive area is coplanar with a side edge of the reflective area.

17. A display apparatus comprising:
a light source;
a quantum dot sheet on which a reflective area that reflects light irradiated from the light source and a quantum dot area including a quantum dot that scatters the light irradiated from the light source are alternately disposed;
a refractive sheet disposed on the quantum dot sheet, and on which a high refractive area and a low refractive area are alternately disposed, the high refractive area being disposed on the quantum dot area to correspond to the quantum dot area and the low refractive area being disposed on the reflective area to correspond to the reflective area; and
a display panel configured to display an image using the light provided from the quantum dot sheet,
wherein a bottom edge of the low refractive area at a point at which the lower refractive area meets the high refractive area coincides with an edge of the reflective area at a point at which the reflective area meets the quantum dot area, and
wherein the low refractive area includes a material through which a portion of the light that penetrates through the quantum dot area is transmitted.

18. A display apparatus comprising:
a light source;
a quantum dot sheet on which a reflective area that reflects light irradiated from the light source and a quantum dot area including a quantum dot that scatters the light irradiated from the light source are alternately disposed;
a refractive sheet disposed on the quantum dot sheet, and on which a high refractive area and a low refractive area are alternately disposed, the high refractive area being disposed on the quantum dot area to correspond to the quantum dot area and the low refractive area being disposed on the reflective area to correspond to the reflective area; and
a display panel configured to display an image using the light provided from the quantum dot sheet,
wherein a bottom edge of the low refractive area at a point at which the lower refractive area meets the high refractive area coincides with an edge of the reflective area at a point at which the reflective area meets the quantum dot area,
wherein the light source is disposed to be spaced apart a distance from the display panel to face a rear surface of the display panel to directly irradiate the display panel, and
wherein the quantum dot sheet is disposed between the display panel and the light source.

* * * * *